Patented Sept. 22, 1925.

1,554,639

UNITED STATES PATENT OFFICE.

CARL MENDIUS, OF RIVERSIDE, ILLINOIS, ASSIGNOR TO SILICA BRICK & ENGINEERING COMPANY, A CORPORATION OF ILLINOIS.

SILICA-LIME BRICK AND METHOD OF PRODUCING THE SAME.

No Drawing.    Application filed May 6, 1924.  Serial No. 711,472.

*To all whom it may concern:*

Be it known that I, CARL MENDIUS, a citizen of the United States, residing at Riverside, county of Cook, State of Illinois, have invented a certain new and useful Improvement in Silica-Lime Bricks and Methods of Producing the Same, and declare the following to be a full, clear, and exact description of the same, such as will enable others skilled in the art to which it pertains to make and use the same.

A type of brick that is largely used is the so-called sand-lime or lime-silica brick, manufactured from sand, slag or other suitable materials containing silica. These materials are mixed with a small percentage of lime and the mixture, slightly moistened, is pressed into the required shapes under heavy pressure. The product is then cured by subjecting it for several hours to the action of steam at a pressure of from one hundred (100) pounds to one hundred twenty-five (125) pounds per square inch until it becomes set and hard. Crushed granite or any hard silica-containing rock, flint, or crushed gravel may be used as the base in making bricks of this kind, producing bricks that possess great strength to resist compression but which are at the same time much heavier than bricks that are made from granulated blast furnace slag which is one of the more desirable materials employed for this purpose. Bricks made from such slag, on the other hand, are not nearly as strong as these heavier bricks. By "granulated slag" I mean the product obtained by running the hot liquid slag from the blast furnace into water. The usual custom is to run the hot molten slag into a body of water contained in a pit close to the blast furnace, the water being agitated by a stream of fresh water running into it.

The object of the present invention is to produce a brick of the type referred to, made principally from granulated slag, so as to retain the characteristic of lightness accompanied, however, by a strength substantially equal to that of the heavier bricks.

I have discovered that by adding to virgin granulated slag a small quantity of granite, flint, gravel, or other hard silica-containing rock, or hard-burned fragments of vitrified brick, pottery, or other materials high in silica content, the resulting brick will possess a strength corresponding to that of a brick made from the material that is so added to the slag. However, since the bulk of the material from which the brick is made consists of virgin, granulated slag, the resulting brick is practically no heavier than one in which slag alone is used. These hard materials high in silica content, should be present in amounts ranging from five per cent (5%) to ten per cent (10%) of the weight of the slag.

No changes are necessary in the usual lime-silica process in order to adapt it to the manufacture of my improved bricks, and therefore existing plants may be used as they are in carrying out my invention or disovery. Bricks made from virgin granulated slag just as it comes from the pit in which it is reduced to its granulated form through the action of water on the hot molten slag are extremely light in weight. If this slag be crushed and broken up the bricks made therefrom are much heavier than those made from the virgin so-called "granulated" slag. I have found that bricks manufactured in accordance with my improved process, not only possess greater strength than those made from crushed or ground slag, but are actually lighter than bricks made simply out of granulated slag that has been crushed or ground. This is of great importance in the building art, because the lighter the brick is, other things being equal, the more desirable it is.

A further advantage results from my invention in cases where only wet slag or wet sand is available. Heretofore, such slag or sand has had to be dried, at considerable expense before bricks coud be made therefrom; but, by mixing with the wet mass of sand or slag a proper amount of dry material added for the purpose of increasing the strength of the finished product, the resulting mixture is often found to be sufficiently dry without the application of heat.

I claim:

1. The process of making a brick which consists in mixing with virgin granulated blast furnace slag a small quantity of lime and a small quantity of a hard crushed material high in silica content, forming the mass in a moistened condition and under heavy pressure into the desired shape, and then curing the brick by subjecting it for several hours to steam at a high pressure.

2. The process of making a brick which consists in mixing with virgin granulated blast furnace slag a small quantity of lime and a small quantity of a crushed hard rock high in silica content, forming the mass in a moistened condition and under heavy pressure into the desired shape, and then curing the brick by subjecting it for several hours to steam at a high pressure.

3. The process of making a colored lime-silica brick which consists in mixing with virgin granulated blast furnace slag a small quantity of lime and a small quantity of crushed granite, forming the mass in a moistened condition and under heavy pressure into the desired shape, and then curing the brick by subjecting it for several hours to steam at a high pressure.

4. A lime-silica brick composed of virgin granulated blast furnace slag and small quantities of lime and a crushed hard material high in silica content, pressed into a brick under heavy pressure and cured by the action of steam at high pressure.

5. A lime-silica brick composed of virgin granulated blast furnace slag, a small quantity of lime, and from five per cent to ten per cent of a crushed hard material high in silica content, pressed into shape under heavy pressure and cured by the action of steam at high pressure.

6. A lime-silica brick composed of virgin granulated blast furnace slag and small quantities of lime and a crushed hard rock high in silica content, pressed into a brick under heavy pressure and cured by the action of steam at high pressure.

7. A lime-silica brick composed of virgin granulated blast furnace slag, a small quantity of lime, and from five per cent to ten per cent of crushed granite pressed into shape under heavy pressure, and cured by the action of steam at high pressure.

In testimony whereof, I sign this specification.

CARL MENDIUS.